March 25, 1952   C. L. HANCOCK   2,590,099
ANIMAL TRAP
Filed May 6, 1947   3 Sheets-Sheet 1

INVENTOR.
Charles L. Hancock
BY Victor J. Evans & Co.
ATTORNEYS

INVENTOR.
Charles L. Hancock
BY Victor J.Evans&Co.
ATTORNEYS

March 25, 1952 C. L. HANCOCK 2,590,099
ANIMAL TRAP
Filed May 6, 1947 3 Sheets-Sheet 3

INVENTOR.
Charles L. Hancock
BY Victor J. Evans & Co.
ATTORNEYS

Patented Mar. 25, 1952

2,590,099

UNITED STATES PATENT OFFICE 2,590,099

ANIMAL TRAP

Charles L. Hancock, Tuthill, S. Dak.

Application May 6, 1947, Serial No. 746,201

4 Claims. (Cl. 43—63)

This invention relates to traps for catching animals alive.

It is an object of the present invention to provide a trap wherein the captured animal can be released without having to work against spring pressure as when the animal is being transferred from a trap to a crate.

It is another object of the present invention to provide a trap which can be easily set and which is responsive to its operation by the movement of the netting which will surround the animal as the trap is released, any movement to the netting causing the release of a trigger and the folding of the trap under the action of its coil springs located at its hinge joint of the net part and the wire mesh part.

Other objects of the present invention are to provide a trap for catching animals alive which is of simple construction, inexpensive to manufacture, of compact size and easy to transport and efficient in operation.

For other objects and for a better understanding of the invention, reference may be had to the following detailed description taken in connection with the accompanying drawing, in which Fig. 1 is a plan view of the trap which is open and set.

Figure 1:
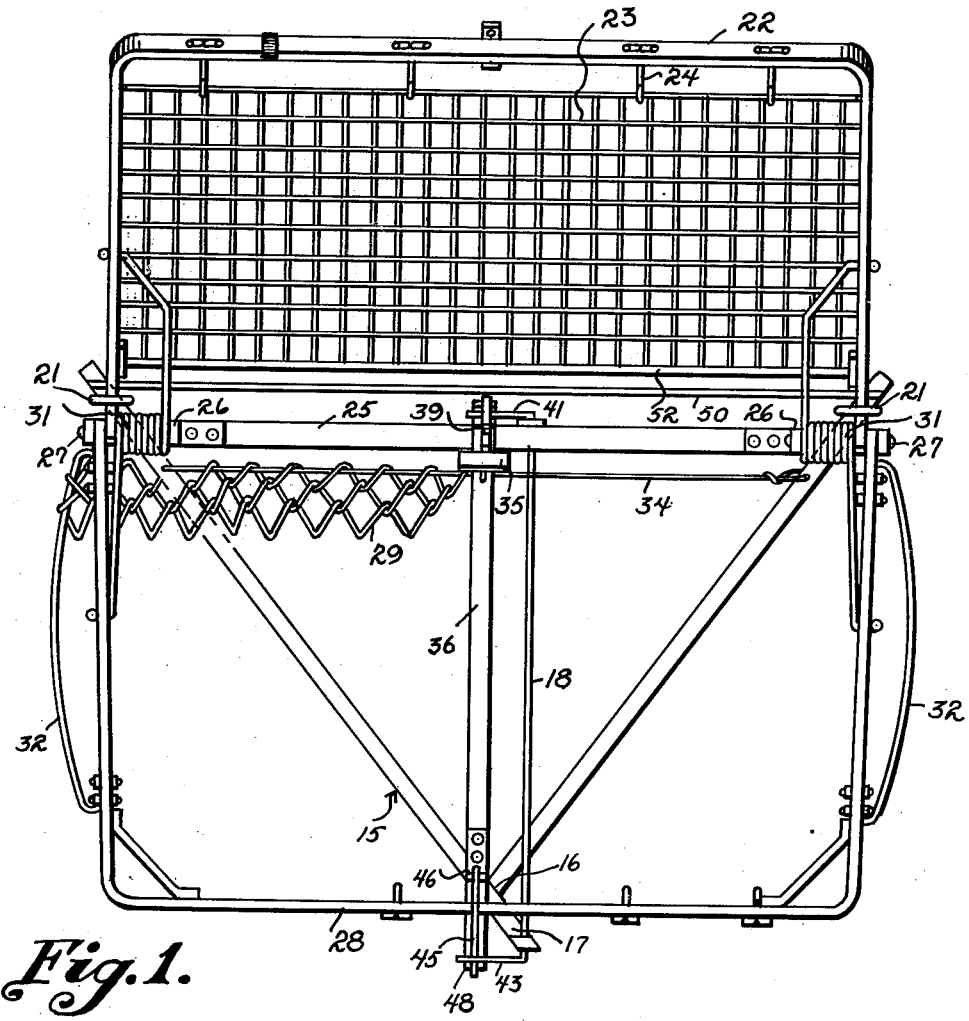

Referring now to the figures, 15 represents a triangular base formed of two parts having angularly disposed side members connected by a transverse member joined as indicated at 16 and having an extended end 17 on one of the side members on which is pivoted one end of a catch rod 18. The said side members are also provided with extended ends that are extended beyond the said transverse member. The inner ends of the members have hooks 19 for retaining a slidable ring 21. This ring 21 surrounds the side ends of a frame 22 to retain that frame in an open position relative to the triangular base 15.

Frame 22 has a screen 23 extending across it and made tight to the frame at its front edge by the fastening elements 24. The triangular frame 15 has a transverse member 25 with brackets 26 for receiving hinge pins 27 to connect together the ends of frame 22 and ends of a frame 28 having a loose netting 29 disposed thereon. Also on these hinge pins 27 are coil springs 31 with extensions engaging respectively with the ends of the frames 22 and 28 to forcibly bring the frames together when they have been released. The animal will then be surrounded by the netting 29 and enclosed within the trap. Extensions 32 are provided on the ends of the frame 28 to provide for a better distribution of the netting upon the frame 28 and provide the necessary flexibility to form a brasket for the captured animal.

Figure 4:
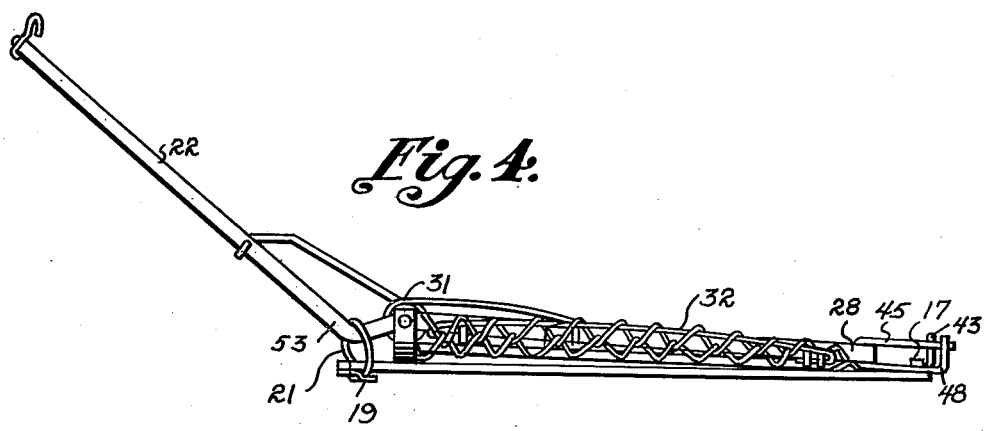
Fig. 4 is an end elevational view of the open trap.
Figure 5:
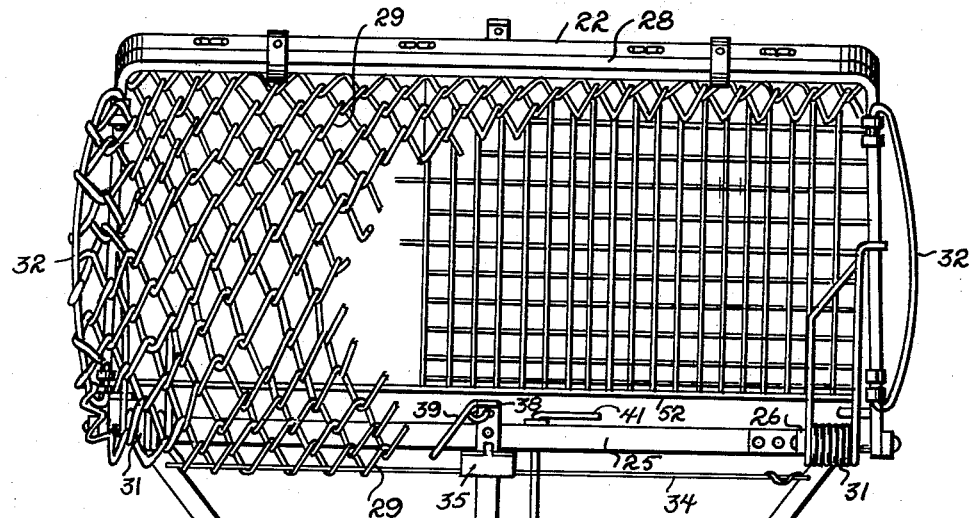
Fig. 5 is a plan view of the closed trap after it has been released and the animal encaged within the same.
Figure 6:
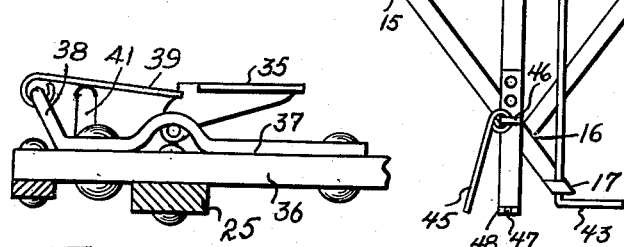
Fig. 6 is an enlarged fragmentary and side elevational view of the trigger which is attached to the wire netting when the trap is set.

When the trap is set it will assume the position shown in Fig. 4. The netting 29 is connected to the triangular frame 15 by a wire 34. A trigger plate or pedal 35 is pivoted upon an intermediate member 36 forming a part of the triangular base 15. The pivotal connection is fixed by means of a bracket 37, Fig. 6, which extends over the top of the member 36 and also has an upstanding portion 38 on which is pivoted a retaining lever 39 adapted to extend over an arm 41 of catch rod 18. As the animal steps into the net and engages trigger plate 35 to release lever 39 and arm 41, the trap will be sprung.

Figure 7:
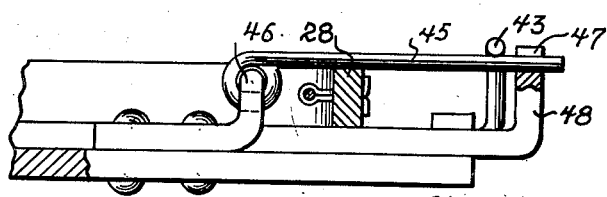
Fig. 7 is an enlarged fragmentary and side elevational view of the catch at the front side of the trap for retaining the outer edge of the parts having the netting.

On the opposite end of catch rod 18 is an arm 43 extending parallel to the arm 41 and adapted to extend over a catch arm 45 to retain it over the front side of frame 28, Fig. 7. This catch arm 45 is pivoted to an upstanding portion 46 on the intermediate member 36 and the arm 45 is brought down to rest in a notch 47 in an upstanding portion 48. It will accordingly be seen that as the trigger plate 35 is tripped that the frame 28 having the netting 29 will rise upwardly about the animal and the animal will be brought against the wire mesh 23 of frame 22. Thereafter the trap with the animal can be conveniently carried.

The trap is set preferably with frame 28 and netting 29 under water and frame 22 with wire mesh 23 securely fastened to a bank, log, rock or other object so that when the trap is sprung, frame 22 remains where it was put. Frame 28 with netting 29 rises out of the water to encircle the animal and bring it onto screen 23 where it remains dry and comfortable awaiting the trappers return. The triangular base 15 remains in the water.

Figure 2:
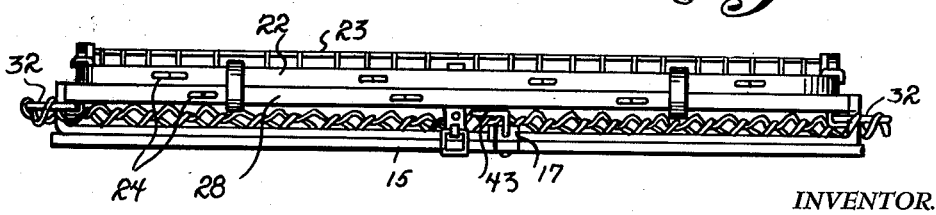
Fig. 2 is a front elevational view of the trap in a closed position as when it is to be transported.
Figure 3:
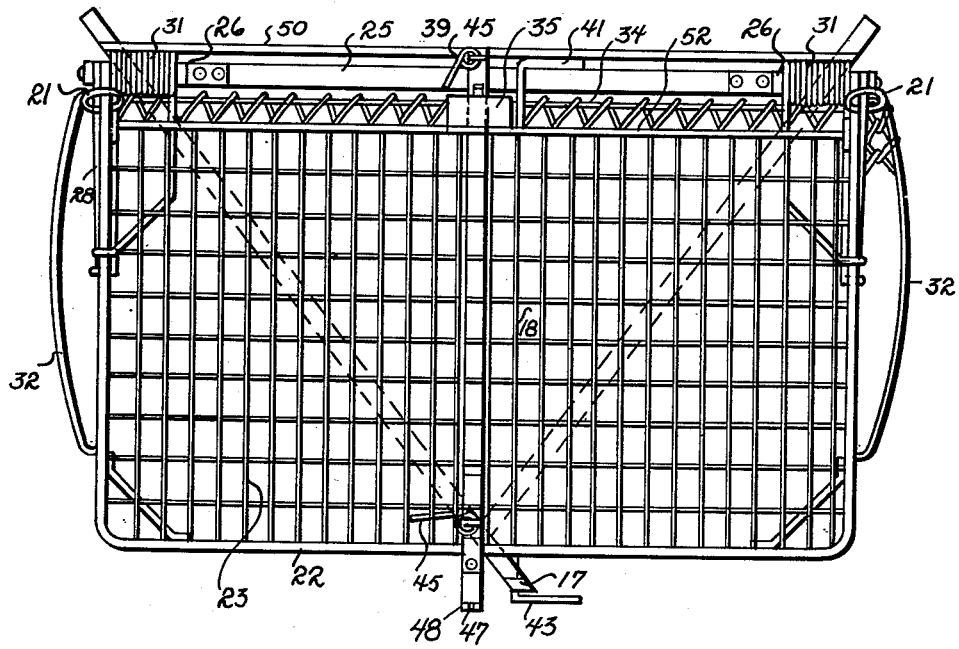
Fig. 3 is a plan view of the closed trap.

A bar 50 extends across the triangular base 15 and serves to fill up space closing an opening between bar 50 and a bar 52 which is fastened to screen 23 on frame 22 and bar 52 is spaced from bar 50 so that the animal cannot escape. By releasing rings 21 from hooks 19 on triangular base 15 and lowering the trap upon base 15 to the position shown in Fig. 2, bar 52 moves away from bar 50 thereby allowing space through which the animal may escape. The opening between these two bars is where the animal comes out. With the crate near the opening the animal will be passed into it. To obtain this result, a bend 53 has been provided at each side of frame 22. This bend also makes it possible to attach the rings 21 to the base 15.

While various changes may be made in the detail construction, it shall be understood that such changes shall be within the spirit and scope of the present invention as defined by the appended claims.

I claim:

1. An animal trap comprising a triangular shaped base having angularly disposed side members with extended ends and a transverse member connecting the said side members and spaced from the ends thereof, a pair of U-shaped frames with wire mesh thereon having end and side members providing first and second frames, hinge pins on the transverse member of the triangular shaped base on which the side members of the U-shaped frames are pivotally mounted, means temporarily attaching the side members of the said first frame to the extended ends of the side members of the base for retaining the said first frame in an extended position in relation to the base, latch means including a trigger and actuator pedal for securing the second of said U-shaped frames against the base, and resilient means adapted to move the said second frame to closed position against the first frame as the latch means is sprung.

2. An animal trap comprising a triangular shaped base having angularly disposed side members with extended ends and a base member connecting the side members and spaced from the ends thereof, a pair of U-shaped frames with wire mesh thereon having ends and side members providing first and second frames, hinge pins on the base member of the triangular shaped base on which the side members of the U-shaped frames are pivotally mounted, the side members of said first frame being extended downwardly from the pivotally mounted ends thereof and upwardly from the downwardly extended section, latch means holding the frames apart, and resilient means for snapping the frames together.

3. An animal trap comprising a triangular shaped base having angularly disposed side members with extended ends and a base member connecting the said side members and spaced from the extended ends thereof, a pair of U-shaped frames with wire mesh thereon having end members and side members providing first and second U-shaped frames, means pivotally mounting the ends of the said side members of the frames to the triangular shaped base, said side members of the first frame having downwardly extended portions therein adjacent the ends through which they are pivotally mounted on the base, rings freely positioned on the said side members of the first frame, means hooking the rings to the extended ends of the side members of the base, the extended ends of the side members of the base also being connected by a transverse rod providing closure means for the opening between the said first and second frames, said first frame having a co-acting rod extended across the end of the side member and to which one side of the wire mesh is connected, latch means including a trigger and an actuator pedal for securing the said second frame in the open position against the base, and resilient means urging the said second frame against the first frame as the latch is released by pressure applied to the said actuator pedal.

4. In an animal trap, the combination which comprises a triangular shaped frame having angularly disposed side members connected with a transverse base member and having ends extended beyond the said base member, hinge pins mounted on the said transverse member of the frame, a second frame having wire mesh thereon pivotally mounted by the hinge pins of the transverse member of the frame, rings positioned on the said second frame and extended over extended ends of the side members of the triangular shaped frame for normally retaining the said second frame in an open upwardly inclined position, a third frame having wire mesh thereon pivotally mounted on the said hinge pins of the transverse base member of the triangular shaped frame, springs for snapping the second and third frames together, a trigger mounted on the triangular shaped frame for retaining the said third frame in an open horizontally disposed position, a bar mounted on the said triangular shaped frame, spaced above the frame and positioned to obstruct a passage between the hinged ends of the said second and third frames with the frames together, a latch mounted on the said triangular shaped frame and positioned to be actuated by the trigger for releasing the said third frame.

CHARLES L. HANCOCK.

REFERENCES CITED

The following references are of record in the file of this patent:

UNITED STATES PATENTS

| Number | Name | Date |
|---|---|---|
| 1,881,530 | Hancock | Oct. 11, 1932 |